US009479647B2

(12) United States Patent
Chandak et al.

(10) Patent No.: US 9,479,647 B2
(45) Date of Patent: Oct. 25, 2016

(54) AUTOMATIC CONFERENCE INITIATION

(71) Applicant: ORACLE INTERNATIONAL CORPORATION, Redwood Shores, CA (US)

(72) Inventors: Anand Chandak, Bangalore (IN); Ankit Mahanot, Delhi (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 227 days.

(21) Appl. No.: 14/228,421

(22) Filed: Mar. 28, 2014

(65) Prior Publication Data

US 2015/0281460 A1 Oct. 1, 2015

(51) Int. Cl.
*H04M 3/56* (2006.01)
*H04M 3/38* (2006.01)

(52) U.S. Cl.
CPC ............ *H04M 3/56* (2013.01); *H04M 3/565* (2013.01); *H04M 3/382* (2013.01)

(58) Field of Classification Search
CPC ....... H04M 3/382; H04M 3/56; H04M 3/565
USPC .............................. 348/14.08; 370/260–262; 379/202.01–206.01; 709/204–207
See application file for complete search history.

(56) References Cited

U.S. PATENT DOCUMENTS

| 2004/0240642 | A1* | 12/2004 | Crandell | H04L 12/585 379/88.22 |
| 2010/0189244 | A1* | 7/2010 | Sastry | H04M 3/56 379/202.01 |
| 2012/0117156 | A1 | 5/2012 | Anka | |

OTHER PUBLICATIONS

Verizon; user guide: conferencing; Instant Meeting Mobile Conference Connection; http://telecom.tamu.edu/files/Mobileconfblackberryguide.pdf; pp. 1-15 , 2007.
Cisco; WebEx Meeting Center User Guide -for Hosts, Presenters, and Attendees; http://www.pdc.edu/wp-content/uploads/2012/01/wx_meeting_center.pdf; pp. 9, and 191-192, downloaded Oct. 31, 2013.
Iotum; Calliflower How-To Guide; http://www.calliflower.com/wp-content/files/Calliflower_How-To_Guide.pdf; pp. 1-18; downloaded Oct. 31, 2013.

* cited by examiner

*Primary Examiner* — Harry S Hong
(74) *Attorney, Agent, or Firm* — Kraguljac Law Group, LLC

(57) ABSTRACT

Systems, methods, and other embodiments associated with automatically connecting a participant to a conference are described. In one embodiment, a method includes generating a code that is provided to the participant of a conference. Generating the code includes storing metadata associated with both the conference and the participant based, at least in part, on a mapping between the code and the metadata. The example method may also include initiating access to the conference for the participant in response to receiving the code from the participant. Initiating access includes initiating a connection to the conference with a device associated with the participant.

18 Claims, 4 Drawing Sheets

… (1)

AUTOMATIC CONFERENCE INITIATION

BACKGROUND

Meetings are an important part of day-to-day professional life. With improvements in technology, many meetings now take place remotely with participants using teleconferencing or a similar technology. Often, participants take part in teleconferencing using cellular telephones or similar devices while on-the-go and/or with participants that are globally distributed.

However, accessing a teleconference can be complicated. For example, a participant needs to know many different details to join a meeting. The details may include a conference telephone number, pass codes, conference identifiers and so on. These difficulties may be exasperated when participants are traveling or otherwise on-the-go.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments are described herein associated with initiating a connection with a conference automatically when a participant provides a single code. In one embodiment, a participant connects to a meeting by texting/emailing the code (e.g., a series of five characters) to a controller. In response to receiving the code, the controller may automatically authenticate the participant and automatically initiate a connection with the participant from the conference (e.g., the conference dials the participant). Thus, the participant can join the conference automatically in one-step without providing several different codes and identifiers over many steps.

Figure 1:
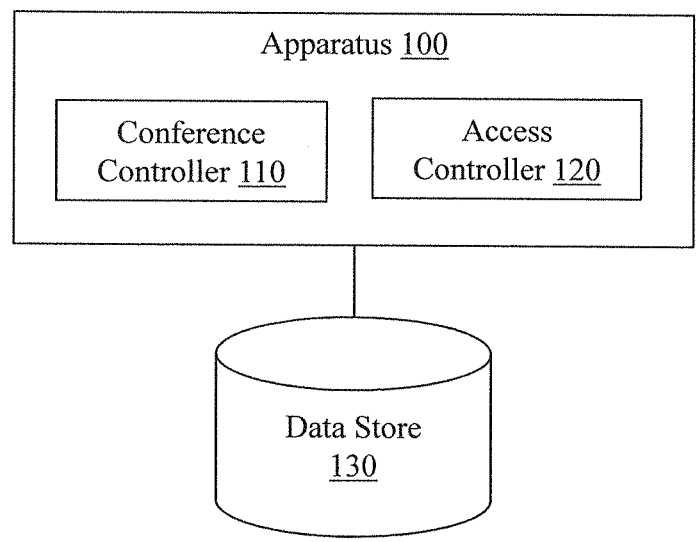
FIG. 1 illustrates one embodiment of an apparatus associated with automatically connecting to a conference using a code.

With reference to FIG. 1, one embodiment of an apparatus 100 associated with auto-initiating a connection to a conference using a single code is illustrated. In one embodiment, the apparatus 100 includes a conference controller 110 and an access controller 120. In general, the conference controller 110 is configured to generate codes for participants of conferences and the access controller 120 is configured to mediate access to the conferences according to the codes.

As used within this disclosure, a conference is a meeting of at least two participants using a conference system (not illustrated) to manage and provide communications between the at least two participants. In one embodiment, the conference system is a teleconference system, a video conference system, an Internet conference system or similar conference system that facilitates communications between multiple participants. In either case, the conference system hosts conferences between various devices (e.g., telephone, mobile smart phone, computer, etc.) associated with multiple participants. Additionally, in one embodiment, access to a conference is generally understood to use two or more pieces of information to log-in and/or authenticate a participant with the conference system.

Thus, in one embodiment, the conference controller 110 is configured to generate a code for a participant to join a conference. Accordingly, instead of the participant using, for example, a conference identifier, a password, a participant identifier and any additional information, the participant uses only the code to join the conference. In this way, the burden of remembering multiple pieces of information is shifted from the participant to the apparatus 100.

The conference controller 110 is configured to generate the code along with, for example, a mapping of the code to the multiple pieces of information for logging into the conference that are stored in a data store 130. The apparatus 100 may store the information for joining a conference as metadata along with the codes in the data store 130.

In general, the data store 130 may be comprised of one or more databases that each store different data. For example, the data store 130 may include an enterprise database that stores enterprise information (e.g., employee identifiers, security access information, employee personal information), a conferencing database that stores conferencing information (e.g., conference schedule, participant list, telephone number, server identifier, password), a security database that stores security information (e.g., authentication credentials, cryptographic key, cryptographic certificate) and so on. Thus, the data store 130 may include several different databases that are part of, for example, an enterprise system.

Together, the information in the data store 130 generally relates to conferences and information about participants of the conferences. This information is the information that the participant may typically provide in order to successfully join a conference. Consequently, the conference controller 110 is configured to collect the information from the disparate data sources (i.e., databases) in the data store 130 and store the information that relates to an individual conference and an individual participant together as metadata. In one embodiment, the conference controller 110 is configured to store the metadata as a comma separated value (CSV). Each comma separated value correlates with a particular participant of a single conference.

In one embodiment, to generate a code, the conference controller 110 applies a hash function to the comma separated value. The conference controller 110 is configured to use the code as a unique identifier of the metadata for a particular conference associated with the participant. Thus, when generating the code, the conference controller 110 is configured to also generate a mapping between the code and the metadata (i.e., the CSV for a participant). For example, the conference controller 110 may use the code as a unique identifier of the metadata in an index or as a primary key in a database. In either case, the code is uniquely linked via the mapping with the metadata.

Accordingly, when a participant provides the code to the access controller 120, the access controller 120, for example, uses the code to determine associated metadata that includes conference information (e.g., conference identifier, phone number) and log-in information for the participant (e.g., ID and password). The access controller 120 may then use the metadata to authenticate the participant and initiate a connection to a device associated with the participant automatically and in response to receiving on the code from the participant.

Figure 2:
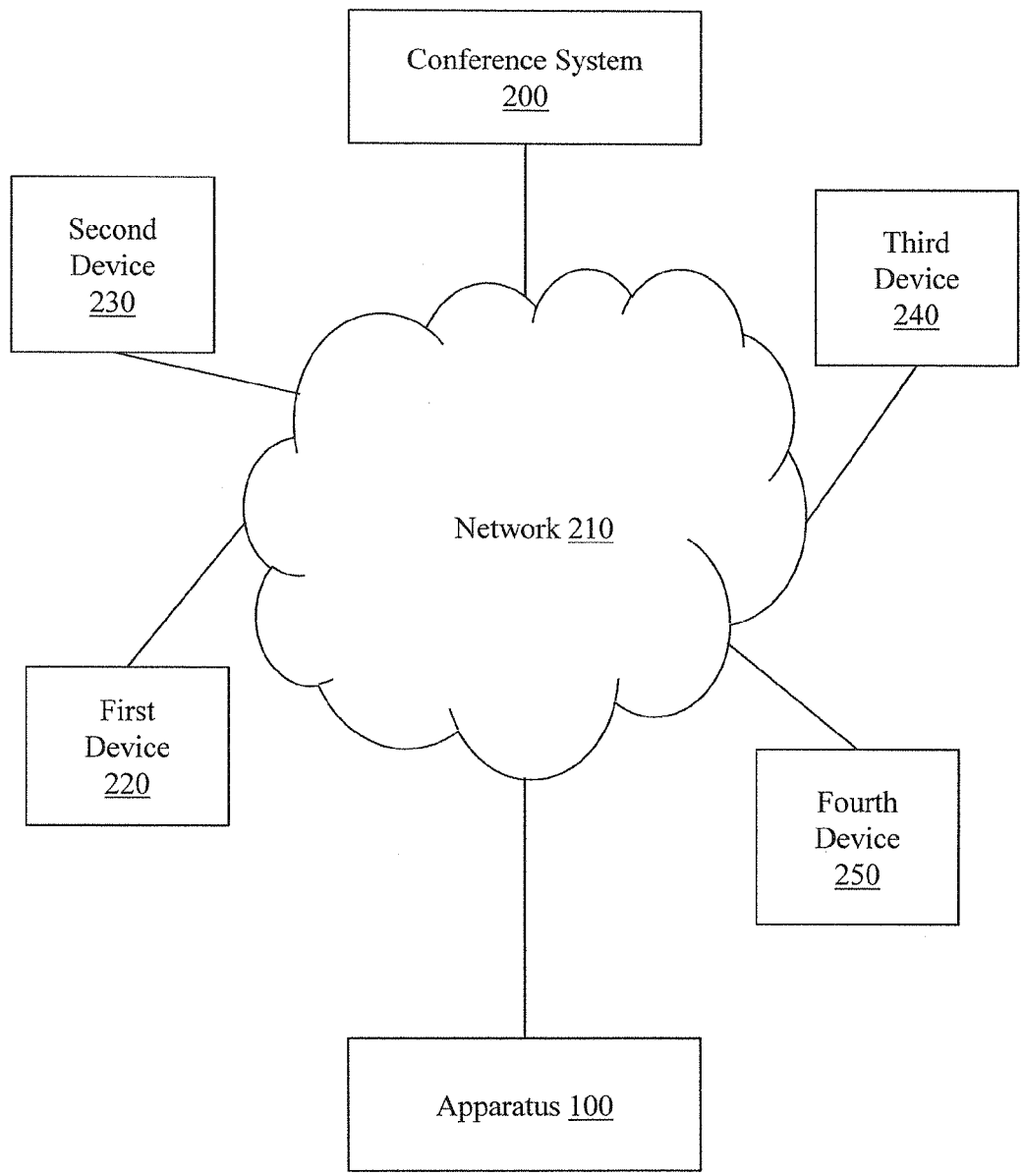
FIG. 2 illustrates one embodiment of a conference system associated with the apparatus of FIG. 1.

FIG. 2 illustrates one embodiment of a conference system 200 along with the apparatus 100 of FIG. 1. The conference system 200 permits conferencing communications between a plurality of participants over a network 210. The apparatus 100 controls access to the conference system 200 and thus also the conference.

The network 210 may carry a single form of communications (e.g., telephone) or multiple forms of communication (e.g., mobile telephone networks, public switched telephone network (PSTN), Internet). A first device 220, a second device 230, a third device 240 and a fourth device 250 (hereinafter collectively referred to as the devices 220-250) are examples of devices that provide communications for the conference on the network 210. In general, the devices 220-250 communicate with the conference system 200, which hosts the conference. The devices 220-250 are, for example, mobile phones, laptops, personal computers, video conferencing systems and so on. Each of the devices 220-250 may provide access to the conference for a single participant or multiple participants. Additionally, while the apparatus 100 and the conference system 200 are illustrated as separate remote elements, of course, in one embodiment, the conference system 200 and the apparatus 100 are collocated or integrated as a single element.

Now consider an example of a conference along with FIG. 2 in which the conference is a teleconference with four participants. In this example, each participant is associated with one of the devices 220-250. In general, the conference is scheduled in the conference system 200 prior to a current time. For example, the conference may be scheduled in advance with particular participants accepting an invitation or by being added to a participant list for the conference. In one embodiment, the participants are selected for the participant list according to a telephone number, email, or other unique identifier of the participant or a device uniquely associated with the participant.

Accordingly, in one embodiment, the conference controller 110 is configured to monitor a schedule that includes multiple conferences to determine whether one or more conferences are to occur within a predetermined amount of time from a current time. When the conference controller 110 determines that the conference is to occur within the predetermined time, the conference controller 110 generates and provides a code to each participant. For purposes of this example each participant is discussed as receiving an individual code; however, in various embodiments participants may share a device, log-in using other methods and so on. Thus, not all participants always use or receive a code.

In either case, the conference controller 110 is configured to generate a code for each participant by applying a hash function to metadata associated with both the conference (e.g., conference identifier, password) and a participant (e.g., participant identifier). In this way, a unique code is generated for each of the four participants in the example. In one embodiment, the unique code is a numeric, alphanumeric or similar sequence of characters. In general, the code is three to five characters in length but may also include more characters depending on a particular use. The code may be limited to only three to five characters to provide a more simple code to remember in contrast to manually providing all of the metadata when logging into the conference.

Accordingly, the conference controller 110 generates a code for each of the four participants associated with the devices 220-250. Thus, an example code may be generated from metadata that includes a unique identifier of the device 220 (e.g., telephone number, IP address, MAC address), a participant ID associated with a participant that uses the first device 220 and a password for the conference. Since metadata for each user will be unique in some way (e.g., combination of participant ID, device ID, conference ID, etc.) each of the codes generated will also be unique.

Subsequently, the conference controller 110 communicates each generated code to a respective participant. In one embodiment, the code may be communicated immediately upon a participant accepting an invitation to a conference or upon a participant being added to a participant list. However, in the present example, each code is communicated as a reminder once a current time is within a predetermined time (e.g., within 15 mins) of the beginning of the conference. Whether communicated immediately upon accepting an invitation or as part of a reminder, the conference controller 110 communicates each code to each respective participant prior to the conference.

The conference controller 110 may communicate a code to a device from which a participant will take part in the conference or, more generally, to any location that has been configured by the participant. Furthermore, in one embodiment, the code may be provided in a short message service (SMS) message (i.e., text message), an email, a reminder, a voicemail, and so on.

In the present example, a first participant receives a text message with a respective code as a reminder on the first device 220. A second participant receives an email as a reminder and accesses the email on the second device 230. A third participant may receive the code in a voicemail via the third device 240 while a fourth participant previously received a code on the fourth device 250 upon accepting an invitation to participate in the conference.

The participants may provide their respective different codes to the access controller 120 in one of several ways. In one embodiment, the access controller 120 is configured to receive the codes through whichever medium they were initially provided. For example, if a code was provided via a text message (SMS) then the access controller 120 may receive the codes via text message from a device associated with the participant. Furthermore, the access controller 120 may receive a code via keypad of a device when connected using a voice telephone line and upon a participant initiating a telephone call to a pre-established conference number. In another embodiment, the access controller 120 may be received via email or another form of electronic communication. In general, the participant provides the code using a device that will be used to participate in the conference. Furthermore, the participant generally provides the code as a reply to a telephone number or other address that originally provided the code.

Additionally, in one embodiment, a code may be provided along with additional configuration attributes for the conference. That is, a participant may communicate the code to the access controller 120 along with additional information to change/add/remove some attribute of the conference. For example, the first participant may text a code to the access controller 120 with a preferred telephone number that is different from a telephone number of the first device 220. Subsequently, the access controller 120 initiates a connection with the preferred number instead of the telephone number of the first device 220.

Additionally, in one embodiment, further security options may be configured within the access controller 120 to prevent a participant from changing a telephone number at which the conference will initiate a connection with the participant. The access controller 120 may be configured with security settings in order to prevent malicious attacks and/or malicious redirection of connections. In one embodiment, a participant may provide additional security information along with the code for a higher level of security (e.g., sensitive or secret conference) or may provide administrative attributes to otherwise modify features of the conference (e.g., cancel, delay, invite additional participants, etc.).

In either circumstance, once the access controller 120 receives a code from a participant, the access controller 120 will attempt to authenticate the participant. In one embodiment, the access controller 120 is configured to use the code to fetch the metadata associated with the participant and the conference from the data store 130. The access controller 120 may apply an additional hash function to the code or may use the code as a value in an index or lookup table in order to retrieve the metadata. In general, the code uniquely references associated metadata that is particular to the participant.

Accordingly, the access controller 120 is configured to retrieve the metadata and automatically authenticates the participant. The access controller 120 may authenticate the participant by providing log-in information to the conference system on behalf of the participant. Traditionally, the participant may have provided at least a password, conference identifier and participant identifier as the log-in information to the conference. However, the access controller 120 retrieves the metadata that includes the log-in information from the data store 130 using the code. Thereafter, the access controller 120 provides the log-in information to the conference system 200 on behalf of the participant. Thus, the participant does not need to remember and provide all of the complex log-in information, but only provides the code which permits the access controller 120 to handle the log-in information on behalf of the participant.

The access controller 120 is configured to, upon receiving confirmation of authentication, initiate a connection between the conference system 200 and a device associated with the participant (e.g., the first device 220). For example, the access controller 120 may control the conference system 200 to initiate a telephone call to the first device 220, an Internet connection to the first device 220 or, more generally, initiate whichever type of connection is appropriate for the conference and a device associated with the participant.

Accordingly, in one embodiment, the access controller 120 automatically initiates a connection with a device of the participant as a function of the code, a type of conference (e.g., video or teleconference) and/or attribute of the device (e.g., laptop, telephone, smart phone, video conference system, etc.). In this way, the connection is auto-initiated with the participant providing only the code.

Figure 3:
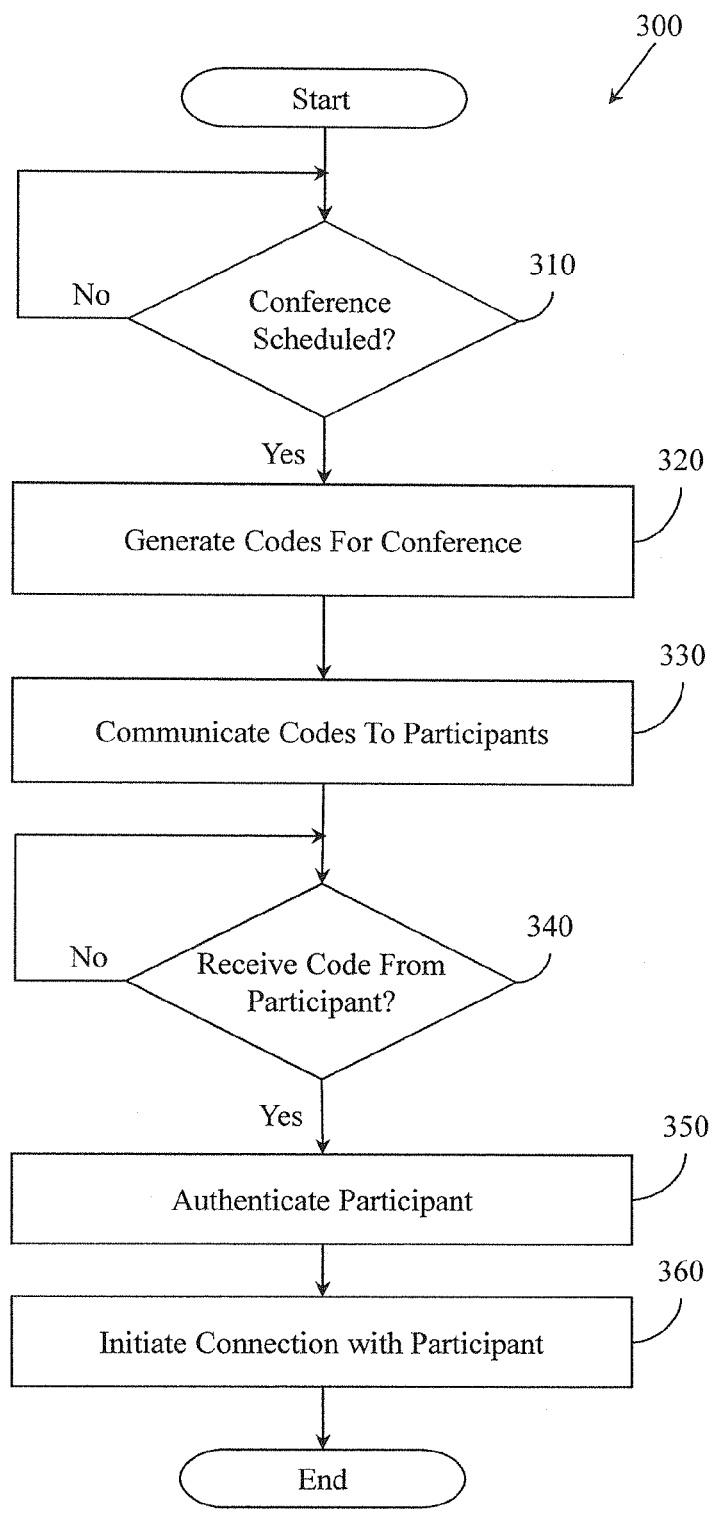
FIG. 3 illustrates one embodiment of a method associated with automatically connecting a participant to a conference using a code.

Further details of auto-initiating a connection in one step will be discussed with respect to FIG. 3. FIG. 3 illustrates a method 300 associated with joining a conference in one step.

At 310, a schedule is, in one embodiment, continuously monitored for upcoming conferences. The schedule may be monitored to determine whether one or more of a plurality of conferences are to occur within a predetermined amount of time from a current time. By monitoring for upcoming conferences, reminders and codes can be provided within a time that is proximate to the conference and, thus, a code is less likely to be lost by a participant.

In response to detecting that a conference is upcoming, a code is generated at 320. In one embodiment, generating a code at 320 includes first obtaining information about the conference and one or more participants of the conference. Accordingly, at 320, information about the conference is retrieved from a data store (e.g., data store 130). The information may include a participant list, a conference identifier, a conference phone number, and so on. Furthermore, information about each participant from the participant list may also be retrieved. The information about each participant may include a participant identifier (e.g., email address, employee id number), contact information for a participant (e.g., telephone number, email, video conferencing identifier) and so on.

Subsequently, the conference information, participant information and any other relevant information (e.g., administrative information) are stored as, for example, metadata of the participant in a common separate value (CSV), XML formatted field, or some similar configuration. In this way, information relevant to a particular participant of a particular conference is stored together in a predetermined format. Accordingly, information is stored for each participant in a similar manner and a code is generated from each set of information. The resulting code is generated, at 320, using a hash function or other function to ensure that each code is unique and can be used as a unique mapping to locate the metadata.

At 330, the codes generated at 320 are communicated to the participants. In one embodiment, the codes are communicated to a same device from which participants will take part in the conference. However, the code only needs to be provided in to the participant so that it is available to them for initiating the conference. Accordingly, the code may be communicated using email, text messaging, voicemail and so on. In one embodiment, the codes are communicated using text messaging from a telephone number that a participant uses to provide the code to when initiating the conference. In this way, the participant may simply reply to the original communication that includes the code when initiating the conference and does not need to remember a specific telephone number or other address.

At 340, prior to initiating a connection with a participant a code must be received. For example, the participant performs a single step of communicating the code to the conference system. In one embodiment, receiving the code from the participant includes receiving one or more configuration attributes from the participant with the code. The configuration attributes are optional but may include a preferred telephone number that is different from a telephone number of a personal device associated with the participant, security information associated with the participant, administrative information (e.g., delay beginning of conference) and so on.

At 350, in response to receiving a code at 340, authentication is automatically requested for the participant to join the conference. In one embodiment, the code is used to retrieve metadata of the participant. As previously described, the metadata may include identifying information about the participant and conference in addition to configuration information (e.g., preferred phone number and other preferences) and log-in information of the participant (e.g., employee id, password). Accordingly, the metadata is used to authenticate the participant with a central enterprise server or other authenticating mechanism, at 350.

If the log-in information for the participant is valid and authenticated at 350, then, at 360, a connection between a device of the participant and the conference is auto-initiated. That is, when the device is a telephone (e.g., mobile phone, smart phone) auto-initiating the connection will ring the device. Upon the participant answering the device the connection is complete and the participant may take part in the conference. In this way, access to a conference can be simplified to, for example, using a single short code (e.g., 3-5 characters) sent via a text message.

Computer Embodiment

Figure 4:
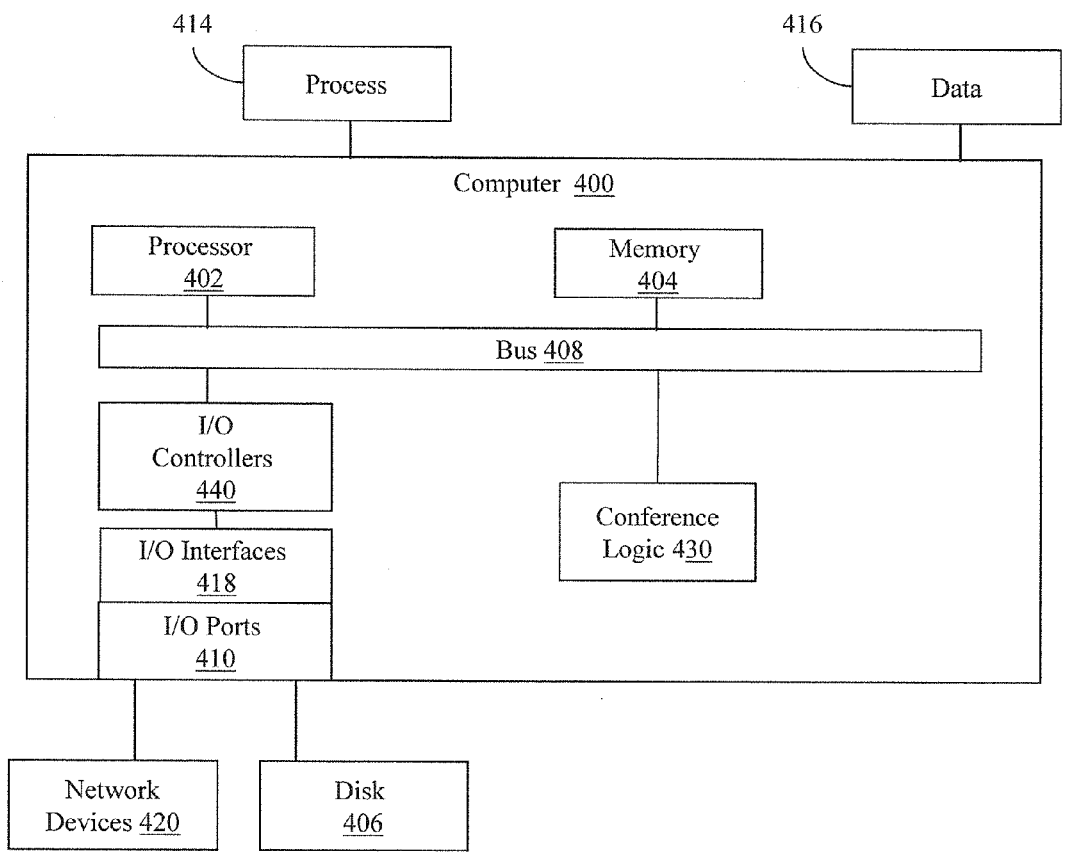
FIG. 4 illustrates an embodiment of a computing system configured with the example systems and/or methods disclosed.

FIG. 4 illustrates an example computing device that is configured and/or programmed with one or more of the example systems and methods described herein, and/or equivalents. The example computing device may be a computer 400 that includes a processor 402, a memory 404, and input/output ports 410 operably connected by a bus 408. In one example, the computer 400 may include conference logic 430 configured to facilitate initialing a conference in one step by a participant similar to the apparatus 100 shown in FIGS. 1 and 2. In different examples, the logic 430 may be implemented in hardware, a non-transitory computer-readable medium with stored instructions, firmware, and/or combinations thereof. While the logic 430 is illustrated as a hardware component attached to the bus 408, it is to be appreciated that in one example, the logic 430 could be implemented in the processor 402.

Generally describing an example configuration of the computer 400, the processor 402 may be a variety of various processors including dual microprocessor and other multi-processor architectures. A memory 404 may include volatile memory and/or non-volatile memory. Non-volatile memory may include, for example, ROM, PROM, and so on. Volatile memory may include, for example, RAM, SRAM, DRAM, and so on.

A storage disk 406 may be operably connected to the computer 400 via, for example, an input/output interface (e.g., card, device) 418 and an input/output port 410. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The computer 400 may interact with input/output devices via the I/O interfaces 418 and the input/output ports 410, which are controlled by an I/O controller 440. Input/output devices may be, for example, a keyboard, a microphone, a pointing and selection device, cameras, video cards, displays, the disk 406, the network devices 420, and so on. The input/output ports 410 may include, for example, serial ports, parallel ports, and USB ports.

The computer 400 can operate in a network environment and thus may be connected to the network devices 420 via the I/O interfaces 418, and/or the I/O ports 410. Through the network devices 420, the computer 400 may interact with a network. Through the network, the computer 400 may be logically connected to remote computers. Networks with which the computer 400 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium," as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. Computer storage medium as described herein are limited to statutory subject matter under 35 U.S.C §101.

"Logic," as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

"User," as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer storage medium storing instructions as a logic that when executed by a device caused the device to at least:
   generate a code that is provided to a participant of a conference, wherein the logic is configured to store metadata associated with both the conference and the participant based, at least in part, on a mapping between the code and the metadata, and
   wherein the logic is configured to generate the code by collecting authentication information for the participant to join the conference and attributes associated with connecting to the conference and storing the authentication information and the attributes as the metadata; and
   initiate access to the conference for the participant in response to receiving the code from the participant, wherein the logic is configured to initiate access by initiating a connection from the conference with a device associated with the participant.

2. The non-transitory computer storage medium of claim 1, where the logic is further configured to:
   prior to initiating access to the conference and in response to receiving the code, automatically authenticate the participant to join the conference using the metadata, wherein the logic is configured to authenticate the participant by fetching the metadata from storage using the code and authorizing the participant to access the conference using the metadata, and wherein the logic is configured to receive only the code from the participant to initiate access.

3. The non-transitory computer storage medium of claim 1, wherein the logic is configured to generate the code by producing the code as a function of the metadata and a hash function, and wherein the code is a unique identifier of the metadata.

4. The non-transitory computer storage medium of claim 1, wherein the logic is configured to monitor a schedule to determine whether one or more of a plurality of conferences are to occur within a predetermined amount of time from a current time, and wherein the plurality of conferences includes the conference,
   wherein the logic is configured to communicate the code to the participant upon determining the conference is scheduled within the predetermined amount of time, and wherein the logic is configured to communicate the code by communicating the code from a conference controller to a device from which the participant will participate in the conference.

5. The non-transitory computer storage medium of claim 1, wherein the logic is configured to initiate access in response to receiving the code in a short message service (SMS) communication from the participant, and wherein the logic is configured to initiate access by using the code to retrieve the metadata as a function of the mapping and generating log-in information on behalf of the participant for the conference using the metadata.

6. The non-transitory computer storage medium of claim 1, wherein the logic is configured to, in response to detecting that the conference is upcoming, retrieve a participant list for the conference and communicate a code to each participant in the participant list, wherein each code is mapped to a different participant and information about the conference, and wherein the metadata is a comma separated value in a database that is uniquely referenced by the code.

7. The non-transitory computer storage medium of claim 1, wherein the logic is configured to receive the code from the participant by receiving one or more configuration attributes from the participant with the code, wherein the configuration attributes include one or more of a preferred telephone number that is different from a telephone number of a personal device associated with the participant or security information associated with the participant, and wherein the conference is a teleconference.

8. The non-transitory computer storage medium of claim 1, wherein the logic is configured to store the metadata by storing at least a conference identifier, an access code for the conference, and a unique identifier of the participant as the metadata, and wherein the logic is configured to initiate the connection by initializing a telephone call with a device associated with the participant.

9. A method, comprising:
   generating, by a conference controller, a code that is provided to a participant of a conference, wherein generating the code includes storing metadata associated with both the conference and the participant based, at least in part, on a mapping between the code and the metadata,
   wherein generating the code includes collecting authentication information for the participant to join the conference and collecting attributes associated with connecting to the conference and storing the authentication information and the attributes as the metadata; and
   initiating, by the conference controller, access to the conference for the participant in response to receiving the code from the particiant, wherein initiating access includes initiating a connection to the conference with a device associated with the participant.

10. The method of claim 9, further comprising:
    prior to initiating access to the conference and in response to receiving the code, automatically authenticating the participant to join the conference using the metadata, wherein authenticating the participant includes fetching the metadata from storage using the code and wherein receiving the code includes receiving only the code from the participant.

11. The method of claim 9, wherein generating the code includes producing the code as a function of the metadata and a hash function, and wherein the code is a unique identifier of the metadata.

12. The method of claim 9, further comprising:
monitoring a schedule to determine whether one or more of a plurality of conferences are to occur within a predetermined amount of time from a current time, wherein the plurality of conferences includes the conference; and
communicating the code to the participant upon determining the conference is scheduled within the predetermined amount of time, wherein communicating the code includes communicating the code from the conference controller to a device from which the participant will participate in the conference, and wherein the conference is a teleconference.

13. The method of claim 9, wherein initiating access occurs in response to receiving the code in a short message service (SMS) communication from the participant, and wherein initiating access includes using the code to retrieve the metadata as a function of the mapping and generating log-in information on behalf of the participant for the conference using the metadata.

14. The method of claim 9, further comprising:
in response to detecting that the conference is upcoming, retrieving a participant list for the conference and communicating participant a code to each participant in the participant list, wherein each code is mapped to metadata for a different participant, and wherein the metadata is a comma separated value in a database that is uniquely referenced by the code.

15. The method of claim 9, wherein receiving the code from the participant includes receiving one or more configuration attributes from the participant with the code, wherein the configuration attributes include one or more of a preferred telephone number that is different from a telephone number of the device associated with the participant or security information associated with the participant.

16. The method of claim 9, wherein storing the metadata includes storing at least a conference identifier, an access code for the conference, and a unique identifier of the participant as the metadata, and wherein initiating the connection includes initializing a telephone connection for a teleconference.

17. A computing system, comprising:
a conference controller configured to generate a code that is provided to a participant of a teleconference, wherein the conference controller is configured to store, in a database, metadata associated with the teleconference and the participant and generate the code as a function of the metadata,
wherein the conference controller is configured to generate the code by collecting authentication information for the participant to join the conference and attributes associated with connecting to the conference and storing the authentication information and the attributes as the metadata; and
an access controller configured to automatically initiate a connection to the teleconference between the participant and a conference system in response to receiving only the code from the participant.

18. The computing system of claim 17, wherein the conference controller is configured to create a mapping between the code and the metadata, and wherein the access controller is configured to automatically log the participant into the teleconference in response to receiving the code by authenticating the participant using the metadata.

* * * * *

UNITED STATES PATENT AND TRADEMARK OFFICE
CERTIFICATE OF CORRECTION

PATENT NO. : 9,479,647 B2
APPLICATION NO. : 14/228421
DATED : October 25, 2016
INVENTOR(S) : Chandak et al.

It is certified that error appears in the above-identified patent and that said Letters Patent is hereby corrected as shown below:

In the Claims

In Column 9, Line 31, in Claim 1, delete "caused" and insert -- cause --, therefor.

In Column 9, Line 50, in Claim 2, delete "where" and insert -- wherein --, therefor.

In Column 10, Line 60, in Claim 9, delete "particiant," and insert -- participant, --, therefor.

Signed and Sealed this
Sixth Day of June, 2017

Michelle K. Lee
*Director of the United States Patent and Trademark Office*